F. SCHUTTE.
Cutting Teeth in Saws.
No. 28,508. Patented May 29, 1860.
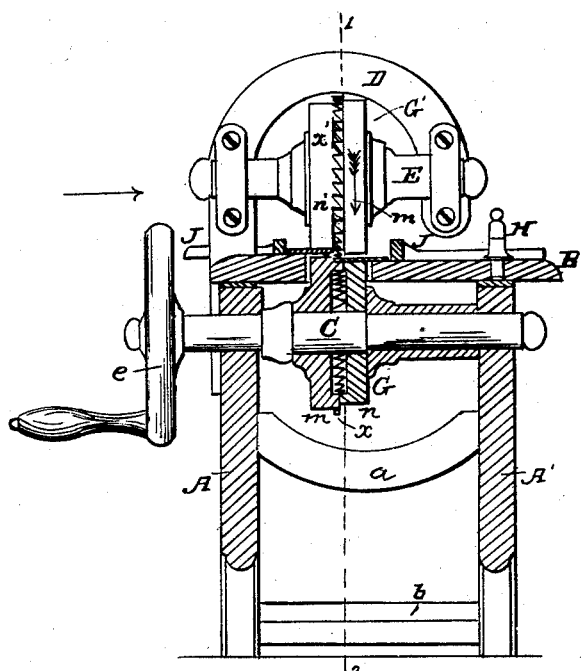
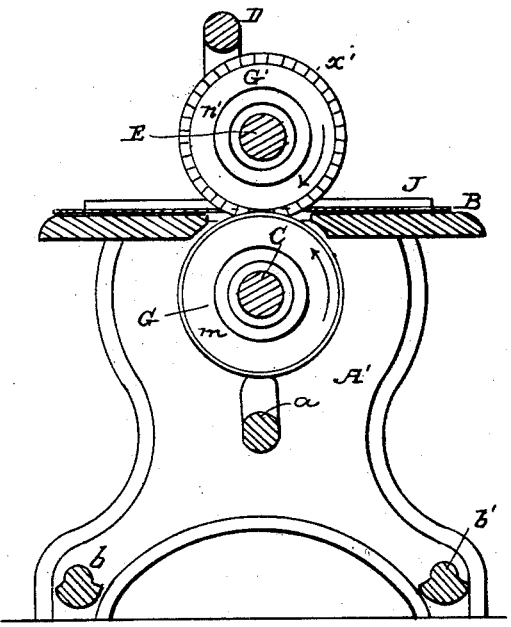
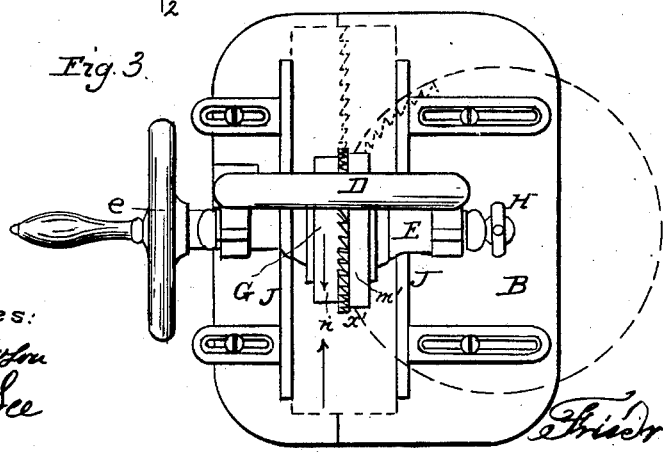

UNITED STATES PATENT OFFICE.

FRIEDRICK SCHUTTE, OF PHILADELPHIA, PENNSYLVANIA.

MACHINE FOR CUTTING SAW-TEETH.

Specification of Letters Patent No. 28,508, dated May 29, 1860.

*To all whom it may concern:*

Be it known that I, FRIEDRICK SCHUTTE, of the city and county of Philadelphia and State of Pennsylvania, have invented a new and Improved Machine for Cutting the Teeth of Saws; and I do hereby declare the following to be a full, clear, and exact description of the same, reference being had to the accompanying drawing and to the letters of reference marked thereon.

My invention relates to machinery for cutting the teeth of saws and consists of two revolving dies, each die being formed of two disks and both dies having permanent angular projections and recesses, the projections of one die being adapted to and gearing into the recesses of the other die, as described hereafter so that a saw blade submitted to the dies may have teeth formed on its edge with greater accuracy and rapidity than by the old method of punching the teeth by hand.

In order to enable others to make and use my invention, I will now proceed to describe its construction and operation.

On reference to the accompanying drawing which forms a part of this specification, Figure 1, is a transverse vertical section of my improved machine for cutting the teeth of saws. Fig. 2, a longitudinal vertical section on the line 1, 2, Fig. 1, and Fig. 3, a ground plan.

Similar letters refer to similar parts throughout the several views.

A and A¹ are the two side frames of the machine connected together in the middle by the cross stay $a$, near the bottom by the cross stays $b$ and $b'$, and at the top by the platform B. In the opposite frames A and A¹ turns a shaft C which is caused to revolve by means of the hand wheel $e$ or any other suitable driving apparatus.

To an overhanging bracket D secured to the side frame A is hung another shaft E situated parallel with and directly over the shaft C. To the lathe is secured a circular die G which consists of two disks $m$ and $n$ firmly secured together, the disk $n$ being somewhat smaller in diameter than the disk $m$. On the faces of the two disks where they meet each other are formed angular projections and recesses, the projections of one disk fitting into the recesses of the other. The angular projections on the disk $m$ project a short distance above the periphery of the disk $n$ and a shorter distance above that of the disk $m$, and thus form punches $x$ of the shape and size of the teeth to be cut on the saw blade.

A circular die G' is secured to the shaft E, and this die is constructed in a manner precisely similar to that above described, the larger disk $m'$ of this die coinciding with the smaller disk $n$ of the lower die and the larger disk $m$ of the latter with the smaller disk $n'$ of the upper die, while the angular projections or punches $x'$ of the upper die fit or gear into the angular recesses formed by the punches of the lower die.

It will be observed on reference to Fig. 1, that the upper surface of one portion of the platform B is on a level with the upper edge of the disk $n$ of the die G, whereas the surface of the other portion of the platform is more elevated, the object of this arrangement will be rendered apparent hereafter.

Operation: Supposing it to be desirable to form the oblong plate of steel, represented by red lines in Fig. 3, into two saws. The guides J J (similar to those used in connection with circular saws) are first adjusted on the platform in such a position as regards the punches $x$ of the circular dies, that the latter shall operate in the middle of the plate and in a line parallel with its edge. The lower die is then turned in the direction of the arrow when the upper die will turn in a contrary direction, inasmuch as the punches $x$ of one gear into those of the other. The oblong plate of steel is then pushed along the platform in the direction of the arrow toward the revolving dies and is drawn in by their punches which sever the plate in a zigzag line corresponding to the form of the coinciding angular projections and recesses of the two dies, thus forming at one operation two separate saw blades with teeth of the desired size and form.

As the plate is being acted upon by the dies, one half of the plate rests on the more elevated portion of the platform, while the other half is depressed to a level with the upper edge of the disk $n$ of the die G, or in other words, to the bottom of the angular recesses of the lower die. It will be seen that by this arrangement the punches have a perfect shearing action and that the distortion of the teeth and plate is avoided.

When the teeth of a circular saw have to be cut, the plate is placed on the platform B with its central opening fitted accurately but loosely to a pin H projecting from the platform, the edge of the plate is then submitted to the action of the rotating dies which not only form the teeth accurately but render the saw perfectly true in diameter and its periphery concentric with the central opening.

It will be readily seen without further description that the teeth of saws may be cut by the above machine not only more rapidly but also more accurately than by the usual process of cutting them by a punch, tooth after tooth.

I claim as my invention and desire to secure by Letters Patent—

The two revolving dies, composed of the disks $m$ and $n$, and having permanent angular projections and recesses, the projections of one die being adapted to and gearing into the recesses of the other die as and for the purpose herein set forth.

In testimony whereof, I have signed my name to this specification before two subscribing witnesses.

FRIEDRICK SCHUTTE.

Witnesses:
HENRY HOWSON,
CHARLES D. FREEMAN.